United States Patent
Hasegawa

(10) Patent No.: US 9,161,194 B2
(45) Date of Patent: Oct. 13, 2015

(54) WIRELESS BASE STATION AND METHOD FOR EMERGENCY INFORMATION DELIVERY

(75) Inventor: Hajime Hasegawa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 212 days.

(21) Appl. No.: 13/079,930

(22) Filed: Apr. 5, 2011

(65) Prior Publication Data

US 2011/0177824 A1 Jul. 21, 2011

Related U.S. Application Data

(63) Continuation of application No. PCT/JP2008/071119, filed on Nov. 20, 2008.

(51) Int. Cl.
 H04B 1/00 (2006.01)
 H04B 15/00 (2006.01)
 (Continued)

(52) U.S. Cl.
 CPC ........ *H04W 4/20* (2013.01); *H04W 4/22* (2013.01); *H04L 67/26* (2013.01)

(58) Field of Classification Search
 CPC ..... H04W 16/14; H04W 28/04; H04W 12/06; H04W 12/12; H04W 72/04; H04W 76/02; H04W 16/10; H04B 1/525; H04L 63/08
 USPC .......... 455/63.1, 411, 450, 458, 561, 551, 69, 455/426.1, 552, 557, 404.1; 370/230, 311, 370/330, 331, 343, 469
 See application file for complete search history.

(56) References Cited

U.S. PATENT DOCUMENTS

| 5,924,042 A * | 7/1999 | Sakamoto et al. ............ 455/458 |
| 6,031,827 A * | 2/2000 | Rikkinen et al. ............. 370/330 |

(Continued)

FOREIGN PATENT DOCUMENTS

| EP | 2 104 382 | 9/2009 |
| JP | 2000-242873 | 9/2000 |

(Continued)

OTHER PUBLICATIONS

International Search Report dated Feb. 17, 2009, from corresponding International Application No. PCT/JP2008/071119.

(Continued)

*Primary Examiner* — William D Cumming
(74) *Attorney, Agent, or Firm* — Katten Muchin Rosenman LLP

(57) ABSTRACT

In a wireless base station, a specific information receiver receives specific information delivered from a higher-level device to a wireless terminal. A specific information deliverer delivers the specific information to the wireless terminal via multiple physical channels activated in a wireless base station. Where a common channel via which information is periodically broadcast to multiple wireless terminals and a shared channel of which available radio resources are allocated to wireless terminals to transmit voice data and the like to the terminals are activated in the wireless base station, for example, the specific information deliverer can deliver the specific information using the common channel if the wireless terminal is in a standby state, and can deliver the specific information using the shared channel if the wireless terminal is in a communicating state.

8 Claims, 12 Drawing Sheets

(51) Int. Cl.
*H04B 7/00* (2006.01)
*H04M 11/04* (2006.01)
*H04M 1/68* (2006.01)
*H04M 3/16* (2006.01)
*H04W 4/20* (2009.01)
*H04W 4/22* (2009.01)
*H04L 29/08* (2006.01)

(56) References Cited

U.S. PATENT DOCUMENTS

| | | | |
|---|---|---|---|
| 6,052,585 A * | 4/2000 | Homma | 455/426.1 |
| 6,093,100 A * | 7/2000 | Singer et al. | 463/13 |
| 6,349,321 B1 * | 2/2002 | Katayama | 718/103 |
| 6,714,784 B1 * | 3/2004 | Forssell et al. | 455/436 |
| 7,107,014 B2 * | 9/2006 | Kekki | 455/69 |
| 7,113,764 B1 * | 9/2006 | Jang et al. | 455/404.1 |
| 7,162,683 B2 * | 1/2007 | Bune | 714/794 |
| 7,203,517 B2 * | 4/2007 | Shimoda et al. | 455/557 |
| 7,398,457 B2 * | 7/2008 | Bune | 714/794 |
| 8,036,171 B2 * | 10/2011 | Inaida | 370/329 |
| 8,085,747 B2 * | 12/2011 | Ogawa | 370/338 |
| 8,121,090 B1 * | 2/2012 | Dinan et al. | 370/331 |
| 8,170,569 B2 * | 5/2012 | Kuningas et al. | 455/450 |
| 8,254,873 B2 * | 8/2012 | Kitahara et al. | 455/404.1 |
| 8,401,036 B2 * | 3/2013 | Chandra et al. | 370/469 |
| 2002/0147948 A1 * | 10/2002 | Bune | 714/704 |
| 2004/0072581 A1 * | 4/2004 | Tajima et al. | 455/456.1 |
| 2004/0082353 A1 * | 4/2004 | Kekki | 455/522 |
| 2004/0162109 A1 * | 8/2004 | Shimoda et al. | 455/557 |
| 2007/0011571 A1 * | 1/2007 | Bune | 714/758 |
| 2007/0111734 A1 * | 5/2007 | Beppu et al. | 455/453 |
| 2008/0298287 A1 * | 12/2008 | Martinez-Perez et al. | 370/311 |
| 2009/0219909 A1 * | 9/2009 | Ko et al. | 370/343 |
| 2009/0280834 A1 * | 11/2009 | Gill et al. | 455/456.5 |
| 2009/0318155 A1 * | 12/2009 | Fukuzawa et al. | 455/438 |
| 2010/0022249 A1 * | 1/2010 | Song | 455/450 |
| 2010/0233990 A1 * | 9/2010 | Kitahara et al. | 455/404.1 |
| 2011/0053629 A1 * | 3/2011 | Seki | 455/509 |
| 2011/0117915 A1 * | 5/2011 | Chang | 455/435.3 |
| 2011/0143812 A1 * | 6/2011 | Ogawa | 455/561 |
| 2011/0177824 A1 * | 7/2011 | Hasegawa | 455/450 |
| 2012/0040619 A1 * | 2/2012 | Zhu | 455/63.1 |
| 2012/0040642 A1 * | 2/2012 | Zhu | 455/411 |
| 2012/0063305 A1 * | 3/2012 | Chiu et al. | 370/230 |

FOREIGN PATENT DOCUMENTS

| | | |
|---|---|---|
| JP | 2001-258070 | 9/2001 |
| JP | 2004-56645 | 2/2004 |
| JP | 2006-20132 | 1/2006 |
| JP | 2006-135398 | 5/2006 |
| JP | 2008-34915 | 2/2008 |
| JP | 2008-48335 | 2/2008 |
| JP | 2010-11190 | 1/2010 |
| WO | 2007/148703 | 12/2007 |
| WO | WO/2007/148703 * | 12/2007 |
| WO | 2008/018130 | 2/2008 |
| WO | 2009/004824 | 1/2009 |

OTHER PUBLICATIONS

3GPP TS 36.300 V8.5.0 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), May 2008.

Japanese Office Action dated Aug. 7, 2012, from corresponding Japanese Application No. 2010-539086.

European Search Report dated Oct. 15, 2014 from corresponding Application No. 08878263.6.

Siemens: "Emergency Alert Service—Alternative Concept", 3GPP Draft; S1-051025, 3rd Generation Partnership Project, Mobile Competence Centre, vol. SA WG1, No. 30, Los Angeles, CA, USA; Oct. 20, 2005, XP050224073.

"Digital cellular telecommunications system (Phase 2+) (GSM); Universal Mobile Telecommunications System (UMTS); High Speed Circuit Switched Data (HSCSD)—Stage 2 (3G TS 23.034 version 3.2.0 Release 1999); ETSI TS 123 034", IEEE, Lis, Sophia Antipolis Cedex, France, vol. 3-CN1, No. V3.2.0, Mar. 1, 2000, XP014007499, ISSN: 0000-0001.

"Digital cellular telecommunications system (Phase 2+); Multiplexing and multiple access on the radio path (GSM 05.02 version 8.2.0 Release 1999); 0502_820", European Telecommunications Standards Institute; vol. zArchive, No. V8.2.0, Feb. 18, 2000, XP014110408.

* cited by examiner

FIG. 5

Emergency Channel (EmCH)
– Support for HARQ;
– Support for dynamic link adaptation by varying the modulation, coding and transmit power;
– Support for both dynamic and semi-static resource allocation;
– Support for MBMS transmission.
– Fixed, pre-defined transport format
– Requirement to be broadcast in the entire coverage area of the cell
– Support for UE discontinuous reception (DRX) to enable UE power saving (DRX cycle is indicated by the network to the UE)
– Mapped to physical resources which can be used dynamically also for traffic/other control channels.

WIRELESS BASE STATION AND METHOD FOR EMERGENCY INFORMATION DELIVERY

This application is a continuing application, filed under 35 U.S.C. §111(a), of International Application PCT/JP2008/071119, filed on Nov. 20, 2008.

FIELD

The present invention relates to a wireless base station, a wireless terminal, a specific information delivery method and a specific information receiving method whereby specific information is delivered to the wireless terminal.

BACKGROUND

One of objectives of mobile communication systems which have already been put to practical use or of which the specifications are currently under development (see 3GPP TS36.300 V8.5.0 (2008-05), for example) is to provide a wide variety of services between mobile stations and network devices. Also, because of the improvement in the diffusion ratio of mobile phones and in the coverage of communication area, present-day mobile communication systems are expected to serve as public communication means during an abnormal time. For example, the mobile communication systems are expected to send users' mobile phones a notification of specific information indicating an emergency situation, such as earthquake information or fire information.

An emergency call accepting system has hitherto been proposed which is configured to accept, through a mobile communication network, image-containing emergency information from a mobile telephone device having a video-telephone function and thus capable of capturing an image and transmitting and receiving images (see Japanese Laid-open Patent Publication No. 2008-48335, for example).

There has also been proposed an emergency reporting system by which, on discovering an abnormal situation, a supervisor can immediately notify nearby workers and the department concerned of the contents of abnormality by voice even in a very noisy environment such as a production site, and also emergency information can be quickly obtained from a separate abnormality detection system insofar as a worker exists in the production site (see Japanese Laid-open Patent Publication No. 2000-242873, for example).

The conventional mobile communication systems are, however, associated with the problem that emergency information fails to be notified immediately depending on the state, such as a standby state or a communicating state, of a wireless terminal.

SUMMARY

According to an aspect of the invention, a wireless base station which communicates wirelessly with a wireless terminal includes: a specific information receiver configured to receive specific information delivered from a higher-level device to the wireless terminal; and a specific information deliverer configured to deliver the specific information received by the specific information receiver, to the wireless terminal via a plurality of physical channels activated in the wireless base station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates functions of an EmCH.

DESCRIPTION OF EMBODIMENT

Figure 1:
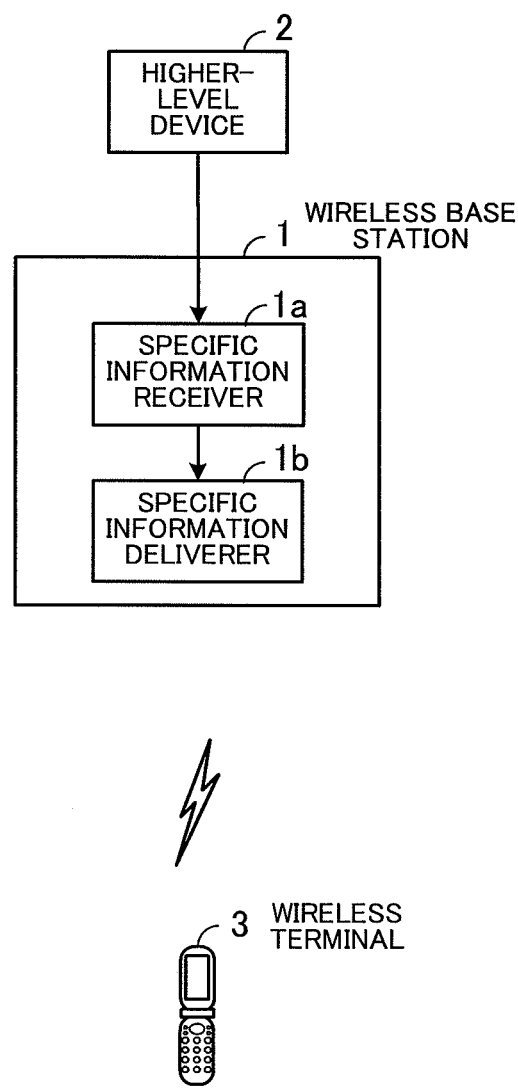
FIG. 1 illustrates a wireless base station.

FIG. 1 illustrates a wireless base station. Also illustrated in FIG. 1 are a higher-level device 2 which controls the wireless base station 1 and a wireless terminal 3 which communicates wirelessly with the wireless base station 1. As illustrated in FIG. 1, the wireless base station 1 comprises a specific information receiver 1a and a specific information deliverer 1b.

The specific information receiver 1a receives specific information delivered from the higher-level device 2 to the wireless terminal 3. The specific information is, for example, emergency information such as earthquake information or tsunami information.

The specific information deliverer 1b delivers the specific information received by the specific information receiver 1a, to the wireless terminal 3 via a plurality of physical channels activated in the wireless base station 1.

For example, a common channel via which information is broadcast to a plurality of wireless terminals and a shared channel of which available radio resources are allocated to wireless terminals to transmit voice data and the like to the wireless terminals are activated in the wireless base station 1. In this case, the specific information deliverer 1b can deliver the specific information to the wireless terminal 3 by using the common channel if the wireless terminal 3 is in a standby state, and can deliver the specific information to the wireless terminal 3 by using the shared channel if the wireless terminal 3 is in a communicating state.

Thus, the wireless base station 1 delivers the specific information via the multiple physical channels activated therein. The wireless terminal 3 can therefore receive the specific information immediately regardless of its state, that is, regardless of whether the wireless terminal 3 is in the standby state or the communicating state.

An embodiment will be now described in detail with reference to the drawings.

Figure 2:
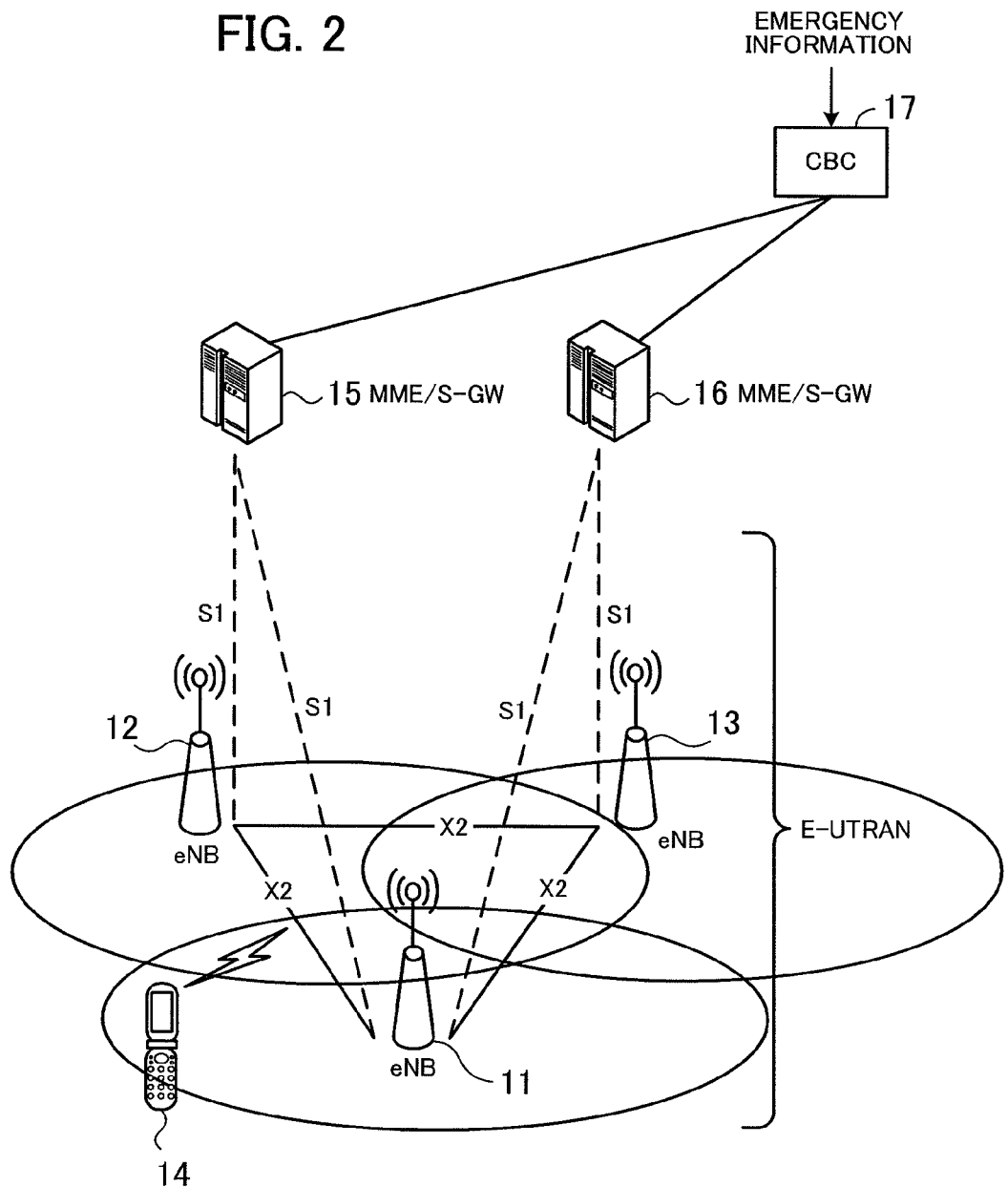
FIG. 2 illustrates an exemplary configuration of a mobile communication system.

FIG. 2 illustrates an exemplary configuration of a mobile communication system. The wireless communication system illustrated in FIG. 2 adopts, for example, an LTE (Long Term Evolution) wireless communication scheme. As illustrated, eNBs (evolved Nodes B) 11 to 13 are connected to MME/S-GWs (Mobility Management Entry/Serving GateWays) 15 and 16.

The eNBs 11 to 13 each perform call control and also control wireless communication with UE (User Equipment) 14. Further, the eNBs 11 to 13 perform radio resource control (RRC). The UE 14 is, for example, a wireless terminal such as a mobile phone. The eNBs 11 to and the UE 14 constitute, for example, an E-UTRAN (Evolved Universal Terrestrial Radio Access Network).

The MME/S-GWs 15 and 16 each terminate signals (NAS (Non Access Stratum) signals) at a layer where messages are exchanged with the UE 14, and also manage the Idle state of the UE 14. Further, the MME/S-GWs 15 and 16 manage SAE (System Architecture Evolution) bearer resources as well as channels established with respect to the UE 14. Each of the MME/S-GWs 15 and 16 may be constituted by two separate devices, one for the MME (function to control the E-UTRAN) and the other for the S-GW (function to terminate data associated with the users).

The eNBs 11 to 13 and the MME/S-GWs 15 and 16 exchange data with each other through S1 interfaces (S1-Application Protocol). The eNBs 11 to 13 exchange data with each other through X2 interfaces (X2-Application Protocol).

A CBC (Cell Broadcast Center) 17 is connected with the MME/S-GWs 15 and 16. When emergency information is received from an emergency information delivery center such as a meteorological institute, for example, the CBC 17 delivers the received emergency information to the MME/S-GWs 15 and 16.

The emergency information is that kind of information which needs to be sent to the users without delay, such as earthquake information and tsunami information. The mobile communication system of FIG. 2 is intended to notify the users of such information within seconds after the occurrence of an earthquake or tsunami so that the users can take appropriate measures against the earthquake or tsunami, such as evacuation.

Let it be assumed that the CBC 17 in FIG. 2 has received emergency information from an emergency information delivery center. In this case, the CBC 17 delivers the received emergency information to the MME/S-GWs 15 and 16.

On receiving the emergency information from the CBC 17, the MME/S-GWs 15 and 16 deliver the emergency information to the eNBs 11 to 13 under their management, by using the control plane or user plane of the S1 interface.

When the emergency information is received from the MME/S-GW 15 or 16, the eNBs 11 to 13 individually deliver the emergency information to the UE 14 that exists within the area of their own. At this time, each of the eNBs 11 to 13 delivers the emergency information to the UE 14 by mapping the emergency information to a plurality of downlink physical channels via which the eNB can communicate (which are activated in the eNB).

Such downlink physical channels include, for example, a common channel via which information is broadcast to a plurality of UEs and a shared channel of which available radio resources are allocated to UEs to transmit voice data, mail data and the like to the UEs. The eNBs 11 to 13 deliver the emergency information to the UE 14 by mapping the emergency information to the multiple physical channels via which the eNBs can communicate.

Consequently, even if the UE 14 is in the standby state, the UE 14 can receive the emergency information from a corresponding one the eNBs 11 to 13 via the common channel for broadcasting information. Also, even while the UE 14 is in the communicating state, the UE 14 can receive the emergency information via the shared channel currently established with respect to the corresponding one of the eNBs 11 to 13. That is, whichever state the UE 14 is currently in, the UE 14 can receive the emergency information without delay.

In this manner, the eNBs 11 to 13 map the emergency information to a plurality of physical channels via which the eNBs 11 to 13 can communicate, in order to deliver the emergency information. This enables the UE 14 to receive the emergency information immediately regardless of whether the UE 14 is in the standby state or the communicating state.

Figure 3:
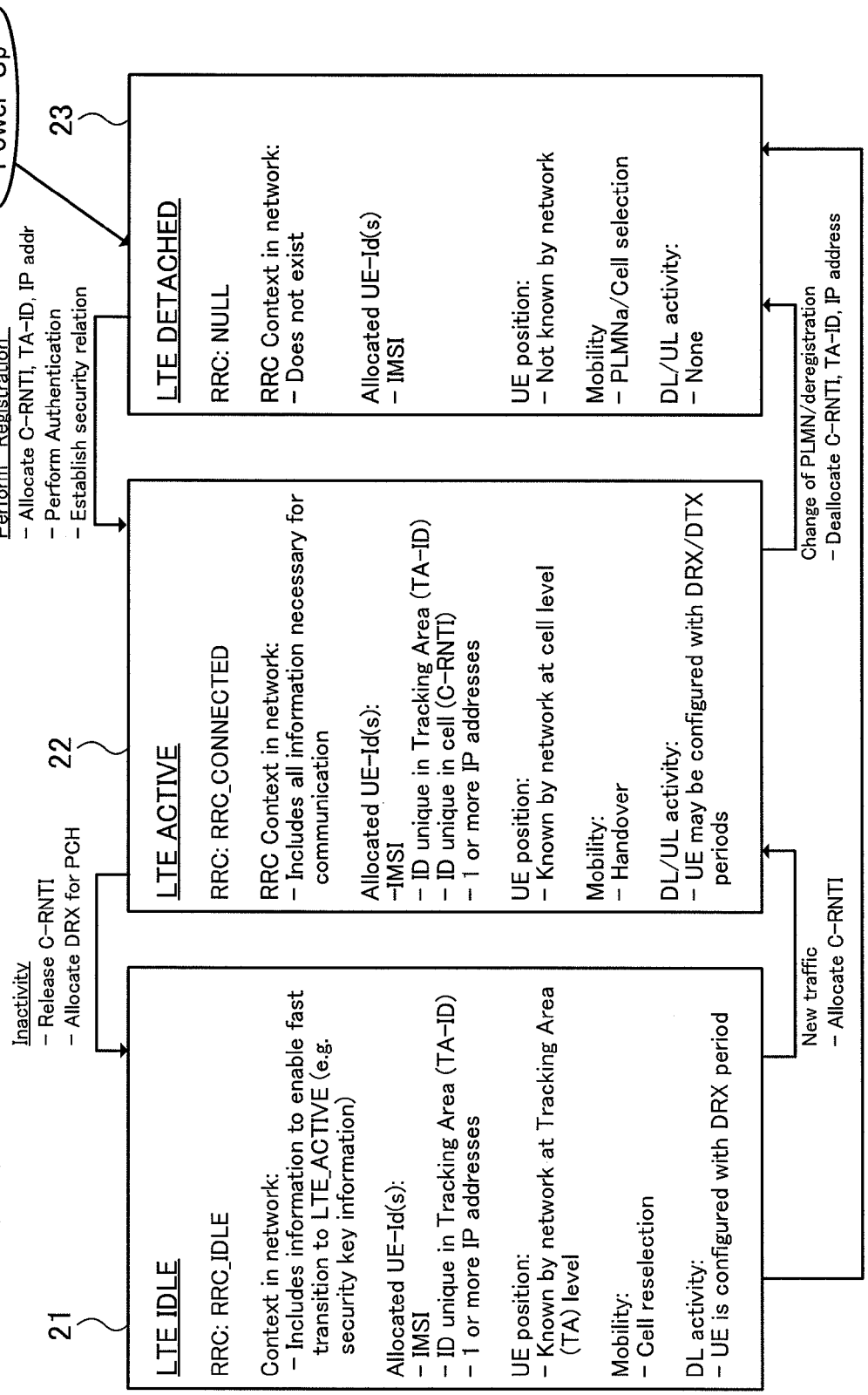
FIG. 3 illustrates states of a UE.

FIG. 3 illustrates states of the UE. As illustrated in FIG. 3, the states of the UE 14 include an Idle state (LTE IDLE) 21, an active state (LTE ACTIVE) 22, and a detached state (LTE DETACHED) 23.

The Idle state 21 indicates a state in which the UE 14 exists within the communication area of any one of the eNBs 11 to 13 and at the same time is in the standby state.

The active state 22 indicates a state in which the UE 14 is communicating. The communicating state includes a connected state in which voice data or mail data is being exchanged, and an MBMS (Multimedia Broadcast Multicast Service) active state in which the UE is receiving broadcast information service data such as television data.

The detached state 23 indicates a state in which the UE 14 is powered off.

Figure 4:
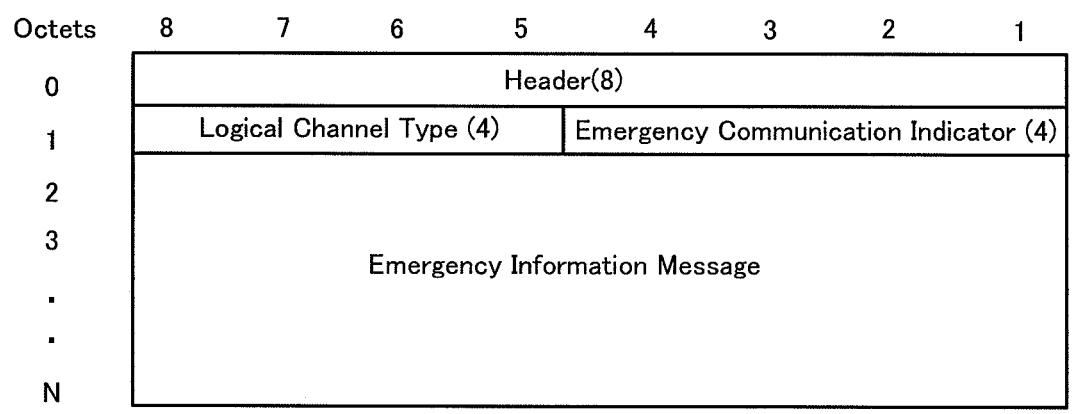
FIG. 4 illustrates a data format of emergency information transmitted from an MME/S-GW to an eNB.

FIG. 4 illustrates the data format of the emergency information transmitted from the MME/S-GWs to the eNBs. When the emergency information is received from the CBC 17, the MME/S-GWs 15 and 16 transmit the emergency information having the format illustrated in FIG. 4, to the eNBs 11 to 13 through the S1 interface.

As illustrated in FIG. 4, the emergency information includes a header (Header), a logical channel type (Logical Channel Type), an emergency communication indicator (Emergency Communication Indicator), and an emergency information message.

The logical channel type indicates the type of a logical channel carrying this information (data). Where the eNBs 11 to 13 receive the emergency information illustrated in FIG. 4 from the MME/S-GWs 15 and 16 via a logical channel called EmCCH (Emergency Control CHannel), for example, information identifying the EmCCH as the logical channel type is stored in the Logical Channel Type field illustrated in FIG. 4.

The emergency communication indicator indicates the contents of the emergency information. For example, information to the effect that an earthquake with a seismic intensity of x occurred at zz:zz or tsunami of y m high was observed is stored in the Emergency Communication Indicator field.

The emergency information message contains a message related to the emergency information. For example, some other information associated with the information indicated by the emergency communication indicator is stored in the Emergency Information Message field.

When the emergency information is received via the logical channel EmCCH, the eNBs 11 to 13 each map the received emergency information to all transport channels currently activated, thereby mapping the emergency information to a plurality of physical channels.

Let it be assumed that transport channels PCH (Paging CHannel), BCH (Broadcast control CHannel), DL-SCH (DownLink Shared CHannel) and MCH (Multicast CHannel), for example, are activated in the eNBs 11 to 13. In this case, on receiving the emergency information illustrated in FIG. 4, the eNBs 11 to 13 each map the received emergency information to the transport channels PCH, BCH, DL-SCH and MCH. Consequently, the emergency information is mapped to the multiple physical channels activated in the eNBs 11 to 13, to be conveyed to the UE 14 which is in the Idle state or the active state.

A new transport channel may be provided in order to map the emergency information to a plurality of physical channels. For example, an EmCH (Emergency CHannel) is provided as a transport channel for mapping the emergency information to a plurality of physical channels.

In this case, on receiving the emergency information, each of the eNBs 11 to 13 maps the received emergency information to the EmCH only, whereby the emergency information can be mapped to a plurality of physical channels.

FIG. 5 illustrates functions of the EmCH. The eNBs 11 to 13 may each be provided, as a transport channel, with the EmCH having the functions illustrated in FIG. 5.

For example, the EmCH has a HARQ (Hybrid Automatic Repeat reQuest) function. Also, the EmCH has an adaptive modulation function whereby, even if the size of the emergency information message illustrated in FIG. 4 is large, the emergency information can be immediately broadcast to the UEs 14 by increasing the number of states per symbol. The EmCH has a function to support MBMS transmission and has a predefined transport format. Preferably, the EmCH is broadcast over the entire coverage area of the cell. Further, the EmCH supports DRX (Discontinuous Reception) to enable the UE 14 to save power, and has a function to map the EmCH to physical channels which are used dynamically as traffic channels or control channels.

Figure 6:
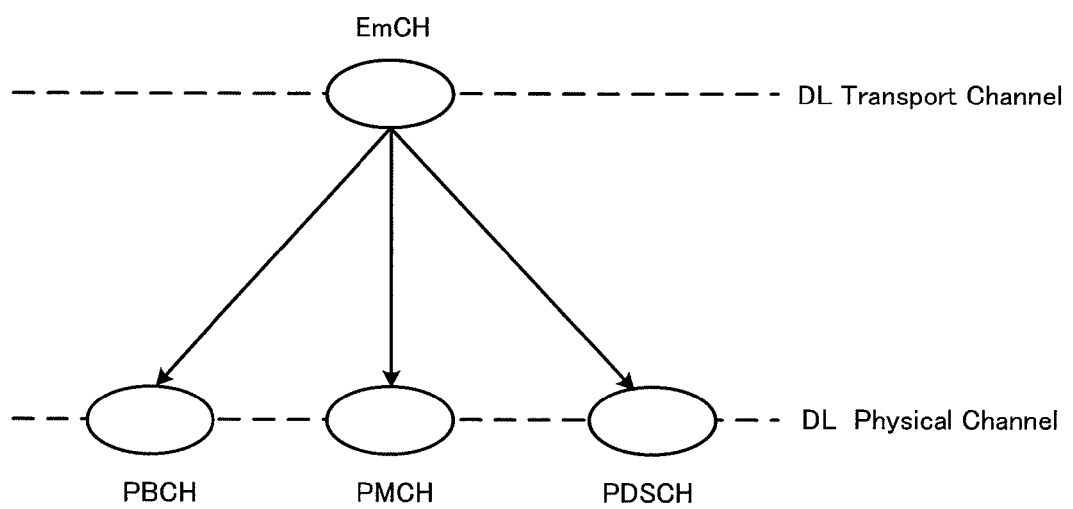
FIG. 6 illustrates mapping of the EmCH to physical channels.

FIG. 6 illustrates the manner of how the EmCH is mapped to physical channels. When the emergency information illustrated in FIG. 4 is received, each of the eNBs 11 to 13 maps, by means of the EmCH, the emergency information to a plurality of physical channels activated therein.

Let us suppose that downlink physical channels PBCH (Physical Broadcast CHannel), PMCH (Physical Multicast CHannel) and PDSCH (Physical DownLink Shared CHannel), for example, are activated in the eNBs 11 to 13. In this case, when the emergency information is received from the MME/S-GW 15 or 16, the eNBs 11 to 13 each map the emergency information to the physical channels PBCH, PMCH and PDSCH with the use of the transport channel EmCH illustrated in FIG. 6.

The PBCH is a physical channel for transmitting broadcast information etc. of the BCH, and transmits broadcast information periodically (e.g., at intervals of 10 seconds) to the UEs 14 which exist within the communication area of the corresponding one of the eNBs 11 to 13 and which are in the standby state. Thus, even if the UE 14 is in the Idle state, the UE 14 is able to receive the emergency information transmitted periodically.

The PMCH is a physical channel for transmitting MBMS data etc. of the MCH to the UE 14. Where MBMS data is being transmitted to the UE 14, the corresponding one of the eNBs 11 to 13 transmits the emergency information along with the MBMS data. Consequently, even in the active state (MBMS active state), the UE 14 can receive the emergency information.

The PDSCH is a physical channel for transmitting data of the DL-SCH and data of the PCH. Thus, even if the UE 14 is in the active state (connected state), the UE 14 is able to receive the emergency information. The PCH is a channel which usually performs updating and modification of a BCCH (Broadcast Control CHannel) when the UE 14 is called (when voice data or mail data is sent to the UE 14), and the UEs 14 which are in the standby state and exist within the communication area are periodically accessed via the PCH. Thus, even while the UE 14 is in the Idle state, the UE 14 is able to receive the emergency information transmitted periodically.

Figure 7:
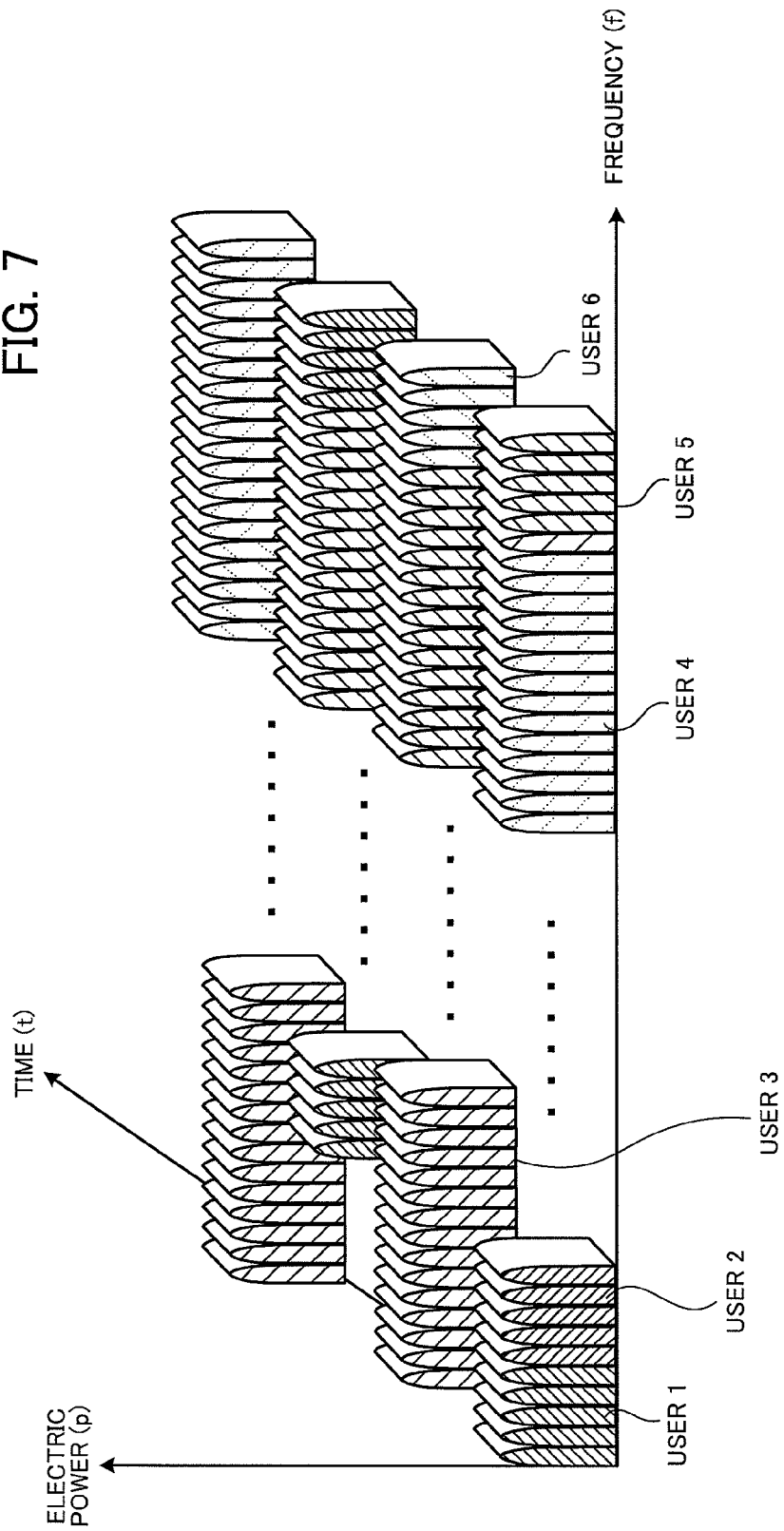
FIG. 7 illustrates allocation of a shared channel.

FIG. 7 illustrates the manner of how the shared channel is allocated. The eNBs 11 to 13 and users 1 to 6 (the UE 14 corresponds to one of the users 1 to 6) communicate wirelessly with each other according to an OFDMA (Orthogonal Frequency Division Multiple Access) wireless communication scheme. As illustrated in FIG. 7, each of the eNBs 11 to 13 allocates different frequencies to different users 1 to 6 as time passes, to carry out wireless communication.

In accordance with the shared channel allocation scheme, even users who are communicating are not always guaranteed radio resources (in terms of both frequency axis and time axis). Also, where there is no user data to be transmitted to a user, the eNBs 11 to 13 can stop allocating radio resources (DRX) to the user. Namely, in some cases, the eNBs 11 to 13 are unable to transmit, via the shared channel, the emergency information to user equipments which are in the active state.

While the user is communicating, however, a logical channel DCCH (Dedicated Control CHannel) is established between the user and a corresponding one of the eNBs 11 to 13. Accordingly, even in the case where the emergency information is unable to be transmitted via the shared channel, the eNBs 11 to 13 can transmit the emergency information by using the DCCH.

When the user is communicating, the eNBs 11 to 13 allocate the emergency information part of the radio resources then allocated to the user. Thus, although the width of radio resources allocated to the communication decreases, the communication is not disconnected.

Figure 8:
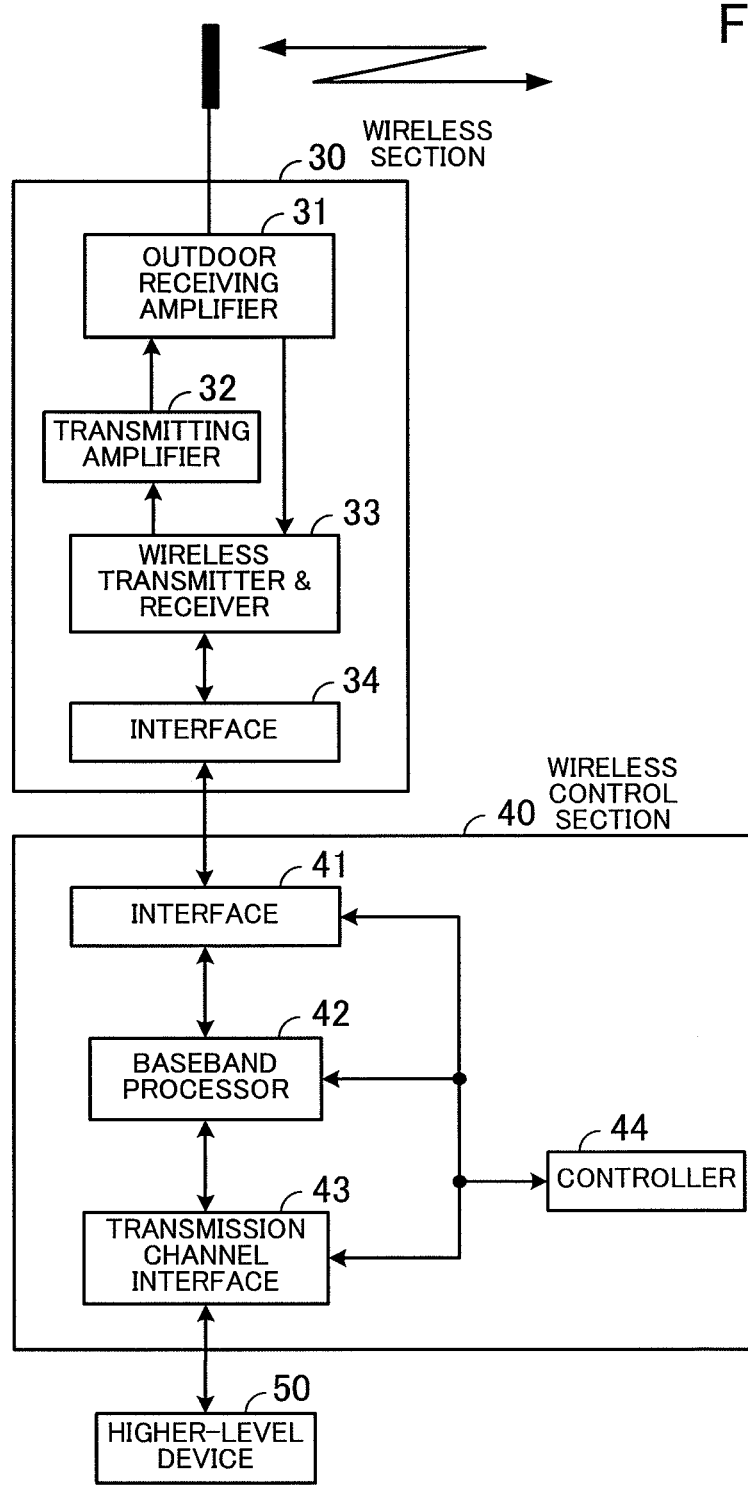
FIG. 8 is a block diagram of the eNB.

FIG. 8 is a block diagram of the eNB. As illustrated in FIG. 8, the eNB 11 comprises a wireless section 30 and a wireless control section 40. A higher-level device 50 appearing in FIG. 8 corresponds to the MME/S-GW 15 or 16 illustrated in FIG. 2. The eNBs 12 and have the same configuration as the eNB 11, and therefore, description thereof is omitted.

The wireless section 30 includes an outdoor receiving amplifier 31, a transmitting amplifier 32, a wireless transmitter and receiver 33, and an interface 34.

The outdoor receiving amplifier 31 amplifies a receive signal received by the antenna, and outputs the amplified signal to the wireless transmitter and receiver 33. Also, the outdoor receiving amplifier 31 outputs, to the antenna, a transmit signal amplified by the transmitting amplifier 32.

The transmitting amplifier 32 amplifies the transmit signal output from the wireless transmitter and receiver 33, and outputs the amplified signal to the antenna through the outdoor receiving amplifier 31.

The wireless transmitter and receiver 33 performs a process for transmitting a radio signal output from the interface 34, as well as a process for receiving the radio signal output from the outdoor receiving amplifier 31.

The interface 34 serves to exchange signals with the wireless control section 40.

The wireless control section 40 includes an interface 41, a baseband processor 42, a transmission channel interface 43, and a controller 44.

The interface 41 exchanges signals with the wireless section 30.

The baseband processor 42 performs a process for generating and receiving L1 (Layer 1) and L2 signals, as well as baseband processing such as modulation and demodulation of data and radio frequency control. Also, the baseband processor 42 carries out a process for mapping, to physical channels, the emergency information received from the higher-level device 50.

The transmission channel interface 43 serves to exchange data with the higher-level device 50.

The controller 44 performs call processing, a process for managing and allocating radio resources, and a process for storing parameters necessary for the wireless communication. Also, the controller 44 controls the baseband processor 42 so that the emergency information received from the higher-level device 50 may be transmitted via a plurality of physical channels. Further, the controller 44 judges whether the emergency information received from the higher-level device 50 needs to be delivered to the UEs 14 or not. The emergency information is worthwhile only if the users are notified of the emergency information within such a time that the users can take appropriate measures against an earthquake, a tsunami or the like. Accordingly, where a permissible time for the notification of emergency information has expired, the controller 44 judges that the notification of the emergency information is useless, and stops a process for delivering the emergency information.

Figure 9:
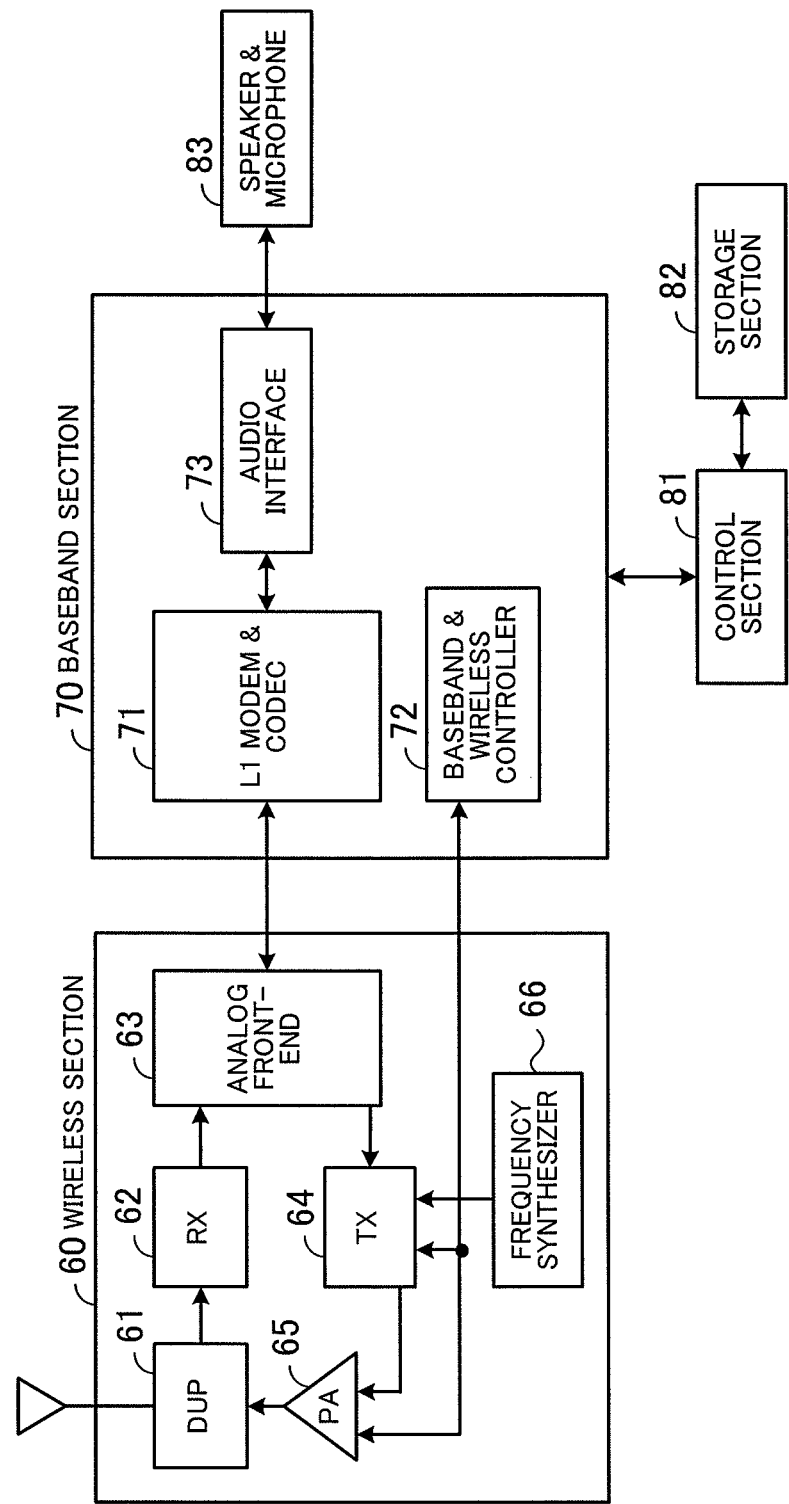
FIG. 9 is a block diagram of the UE.

FIG. 9 is a block diagram of the UE. As illustrated in FIG. 9, the UE 14 comprises a wireless section 60, a baseband section 70, a control section 81, a storage section 82, and a speaker and microphone 83.

The wireless section 60 includes a DUP (Duplexer) 61, an RX (Receiver) 62, an analog front-end 63, a TX (Transmitter) 64, a PA (Power Amplifier) 65, and a frequency synthesizer 66.

The DUP 61 isolates radio signals such that the signals can be transmitted and received by a single antenna.

The RX 62 amplifies a receive signal output from the DUP 61 and outputs the amplified receive signal to the analog front-end 63.

The analog front-end 63 converts the analog receive signal output from the RX 62 to digital data. Also, the analog front-end 63 converts digital data output from an L1 modem and codec 71 to an analog transmit signal.

The TX 64 converts the analog transmit signal output from the analog front-end 63 to a radio signal. In this case, the TX 64 converts the transmit signal to a radio signal in accordance with an oscillation signal output from the frequency synthesizer 66 as well as instructions from a baseband and wireless controller 72.

The PA 65 amplifies the radio signal output from the TX 64 and outputs the amplified signal to the DUP 61.

The frequency synthesizer 66 outputs, to the TX 64, the oscillation signal for converting the transmit signal to a radio signal.

The baseband section 71 includes the L1 modem and codec 71, the baseband and wireless controller 72, and an audio interface 73.

The L1 modem and codec 71 performs L1 layer processing and channel codec processing on the user's voice signal output from the audio interface 73 as well as on the receive signal output from the analog front-end 63.

The baseband and wireless controller 72 carries out baseband processing, such as modulation and demodulation of data, and a process for controlling the radio frequency of the TX 64. Also, the baseband and wireless controller 72 performs electric power control for the PA 65 to suppress distortion and the like of the transmit signal.

The audio interface 73 is an interface for exchanging voice data with the speaker and microphone 83.

The control section 81 controls the entire UE 14. The control section 81 notifies the user of the reception of emergency information by sounding a warning tone, for example, on the basis of the emergency information received earliest among those delivered via a plurality of physical channels.

Then, the control section 81 displays the contents of the emergency information on the display screen. Also, the control section 81 judges whether an effective period of the received emergency information has expired or not, because it is useless to notify the user of the emergency information after a lapse of such a predetermined time.

The storage section 82 is a memory storing an application for controlling the entire UE 14. The storage section 82 also stores an application for notifying the user of emergency information upon receipt.

The speaker and microphone 83 converts the voice signal output from the audio interface 73 to voice. Also, the speaker and microphone 83 converts the user's voice to an electrical signal and outputs the electrical signal to the audio interface 73.

Figure 10:
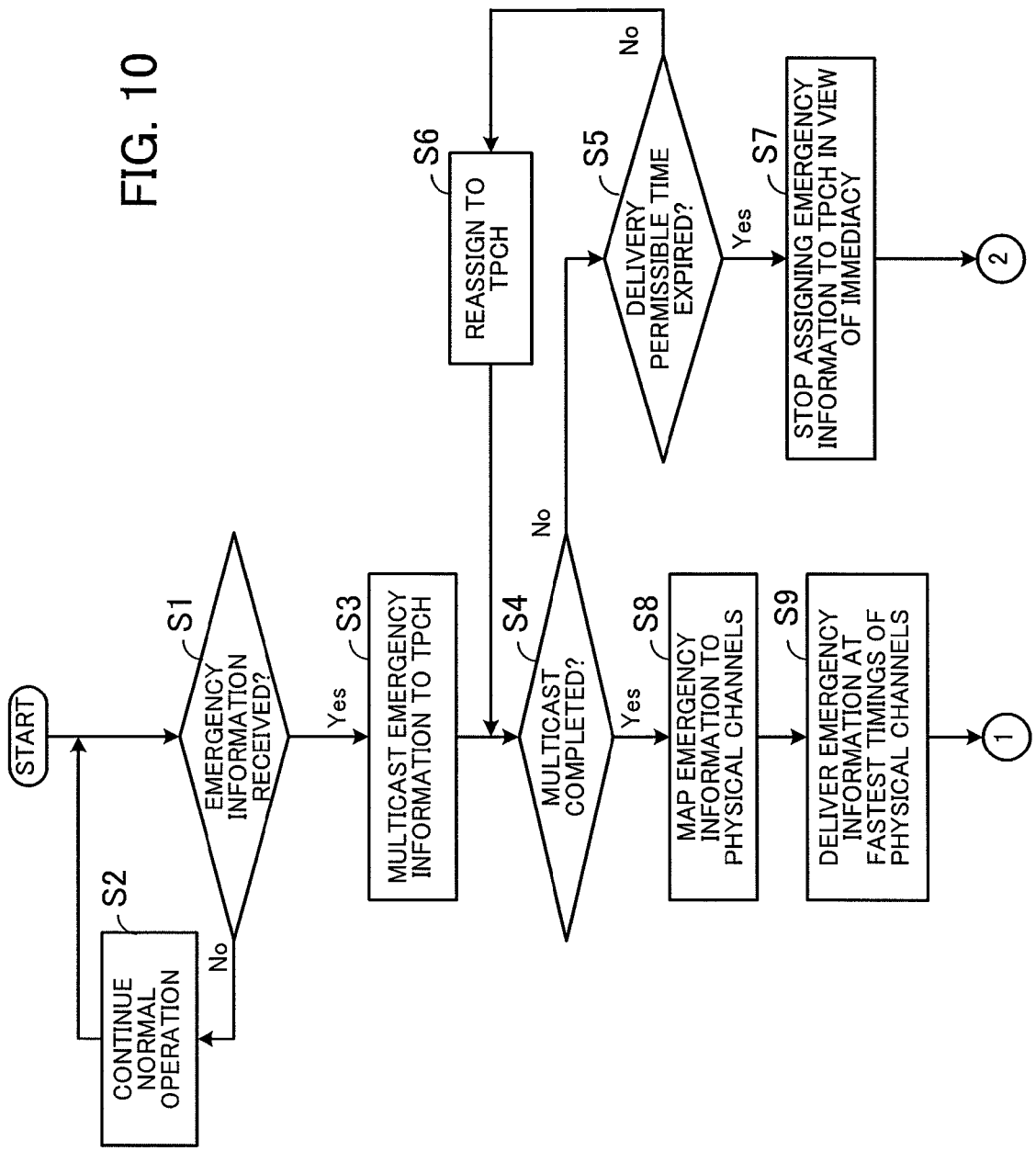
FIG. 10 is a flowchart illustrating operation of the eNB.
Figure 11:
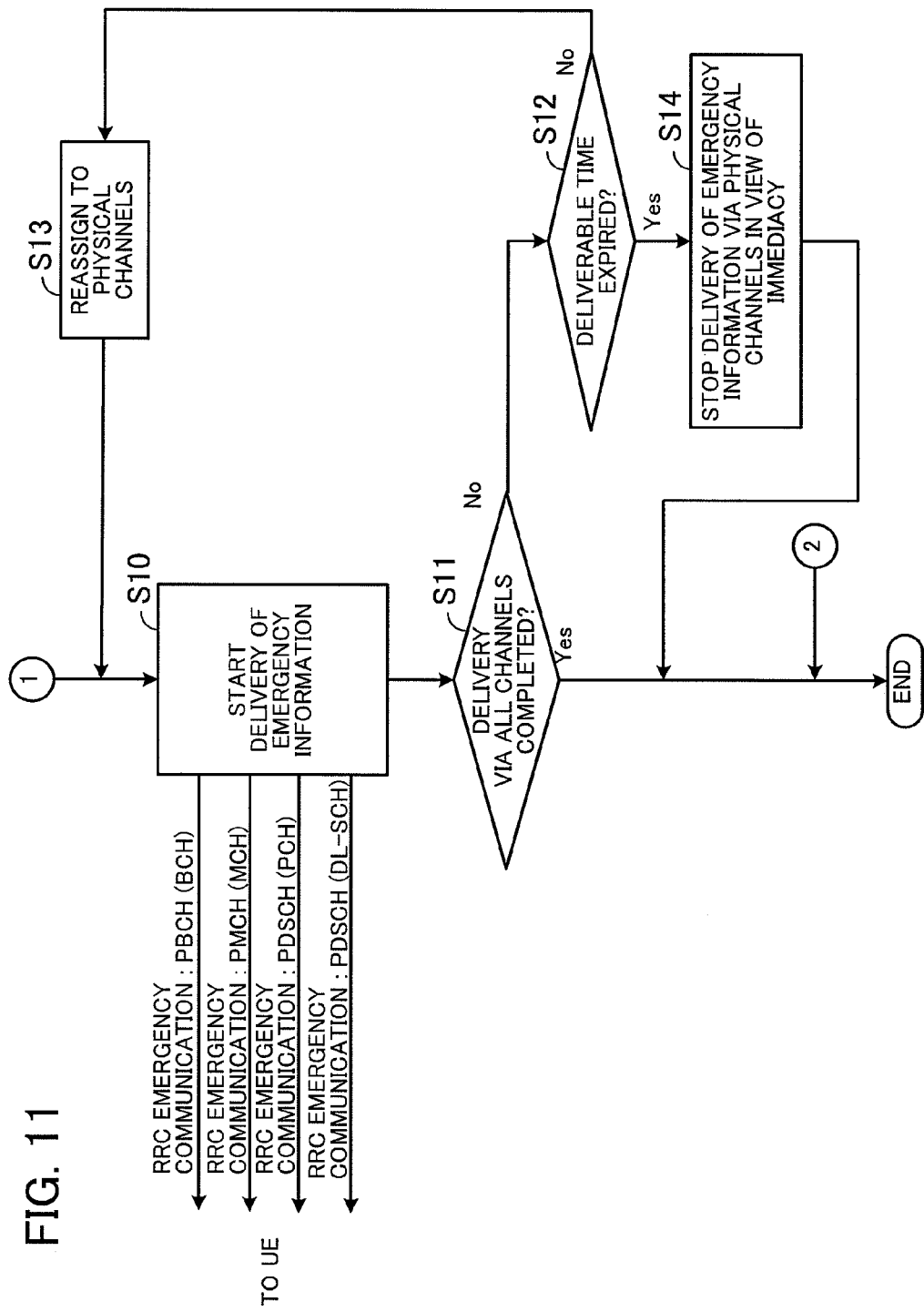
FIG. 11 is a flowchart illustrating the operation of the eNB.

FIGS. 10 and 11 illustrate a flowchart explaining the operation of the eNB. The eNB 11 recognizes the transport channels activated therein. For example, the eNB 11 recognizes the types and number of common channels such as the PCH and the BCH. Also, the eNB 11 recognizes the number of UEs with which connection is established, as well as the number of UEs that exist within the communication area thereof. In the following, the operation of the eNB 11 is explained, but the eNBs 12 and 13 also operate in the same manner.

In Step S1, the eNB 11 determines whether or not emergency information has been received from the MME/S-GW 15, 16. If emergency information has been received, the eNB 11 proceeds to Step S3; if no emergency information has been received, the eNB 11 proceeds to Step S2.

In Step S2, the eNB 11 continues its normal operation. For example, the eNB 11 performs call processing.

In Step S3, the eNB 11 multicasts the received emergency information to the transport channels (TPCH) activated therein. Where the transport channels BCH, PCH, MCH and DL-SCH are activated, for example, the eNBs 11 to 13 multicast the emergency information to these transport channels.

In Step S4, the eNB 11 determines whether or not the multicast of the emergency information to the transport channels has been completed. If the multicast of the emergency information to the transport channels has been completed, the eNB 11 proceeds to Step S8; if the multicast of the emergency information to the transport channels is not completed yet, the eNB 11 proceeds to Step S5.

In Step S5, the eNB 11 determines whether or not the time spent on multicasting the emergency information has exceeded a delivery permissible time. If the delivery permissible time has expired, the eNB 11 proceeds to Step S7; if the delivery permissible time has not yet expired, the eNB 11 proceeds to Step S6.

It is desirable that information about an earthquake or tsunami be delivered to the users within a predetermined time after the occurrence of the earthquake or tsunami so that the users can flee to a place of safety, for example. Accordingly, the eNB 11 determines whether the delivery permissible time of the emergency information has expired or not. Specifically, the eNB 11 compares the time of occurrence of an earthquake or tsunami included in the emergency information with the current time, and calculates the time elapsed from the occurrence of the earthquake or tsunami. Then, the eNB 11 compares the elapsed time thus calculated with a predetermined delivery permissible time within which the emergency information is to be delivered, to determine whether the delivery permissible time of the emergency information has expired or not.

In Step S6, the eNB 11 again assigns the emergency information to the transport channel for delivery.

In Step S7, in the light of the immediacy of emergency information, the eNB 11 stops assigning the transport channels the emergency information of which the delivery permissible time has expired. The eNB 11 then terminates the emergency information delivery process.

In Step S8, the eNB 11 maps the emergency information from the transport channels to respective physical channels. For example, the eNB 11 maps, to the physical channel PBCH, the emergency information which has been assigned to the BCH, and maps, to the physical channel PMCH, the emergency information which has been assigned to the PCH. Also, the eNB 11 maps, to the physical channel PDSCH, the emergency information which has been assigned to the PCH and the DL-SCH.

In Step S9, the eNB 11 delivers the emergency information at the fastest timings of the respective physical channels. Where the BCH delivers information at intervals of t seconds, for example, the eNB 11 transmits the emergency information at the next transmission timing of the BCH, if possible.

In Step S10, the eNB 11 starts to deliver the emergency information via the individual physical channels. For example, the eNB 11 starts to deliver the emergency information via the PBCH, the PMCH, and the PDSCH. In FIG. 11, the letters in parentheses denote the transport channels from which the emergency information is mapped to the respective physical channels.

In Step S11, the eNB 11 determines whether or not the delivery of the emergency information via all physical channels has been completed. If the delivery of the emergency information via all of the physical channels has been completed, the eNB 11 terminates the process; if the delivery of the emergency information via all physical channels is not completed yet, the eNB 11 proceeds to Step S12.

In Step S12, the eNB 11 determines whether or not the time spent on delivering the emergency information has exceeded a deliverable time. If the deliverable time has expired, the eNB 11 proceeds to Step S14; if the deliverable time has not expired yet, the eNB 11 proceeds to Step S13.

Whether the emergency information deliverable time has expired or not is determined by the eNB 11 because it is desirable that the emergency information be delivered to the users within the predetermined time, as explained above with reference to Step S5.

In Step S13, the eNB 11 again assigns the emergency information to the physical channels for redelivery.

In Step S14, in view of the immediacy of emergency information, the eNB 11 stops delivering, via the physical channels, the emergency information of which the deliverable time has expired. The eNB 11 then terminates the emergency information delivery process.

In the flowchart illustrated in FIGS. 10 and 11, the eNB 11 multicasts the received emergency information to the transport channels activated therein. Where the EmCH is provided as a transport channel as explained above with reference to FIG. 6, the received emergency information is assigned to the EmCH. In this case, the emergency information is mapped from the EmCH to the physical channels PBCH, PMCH and PDSCH activated in the eNB 11.

Figure 12:
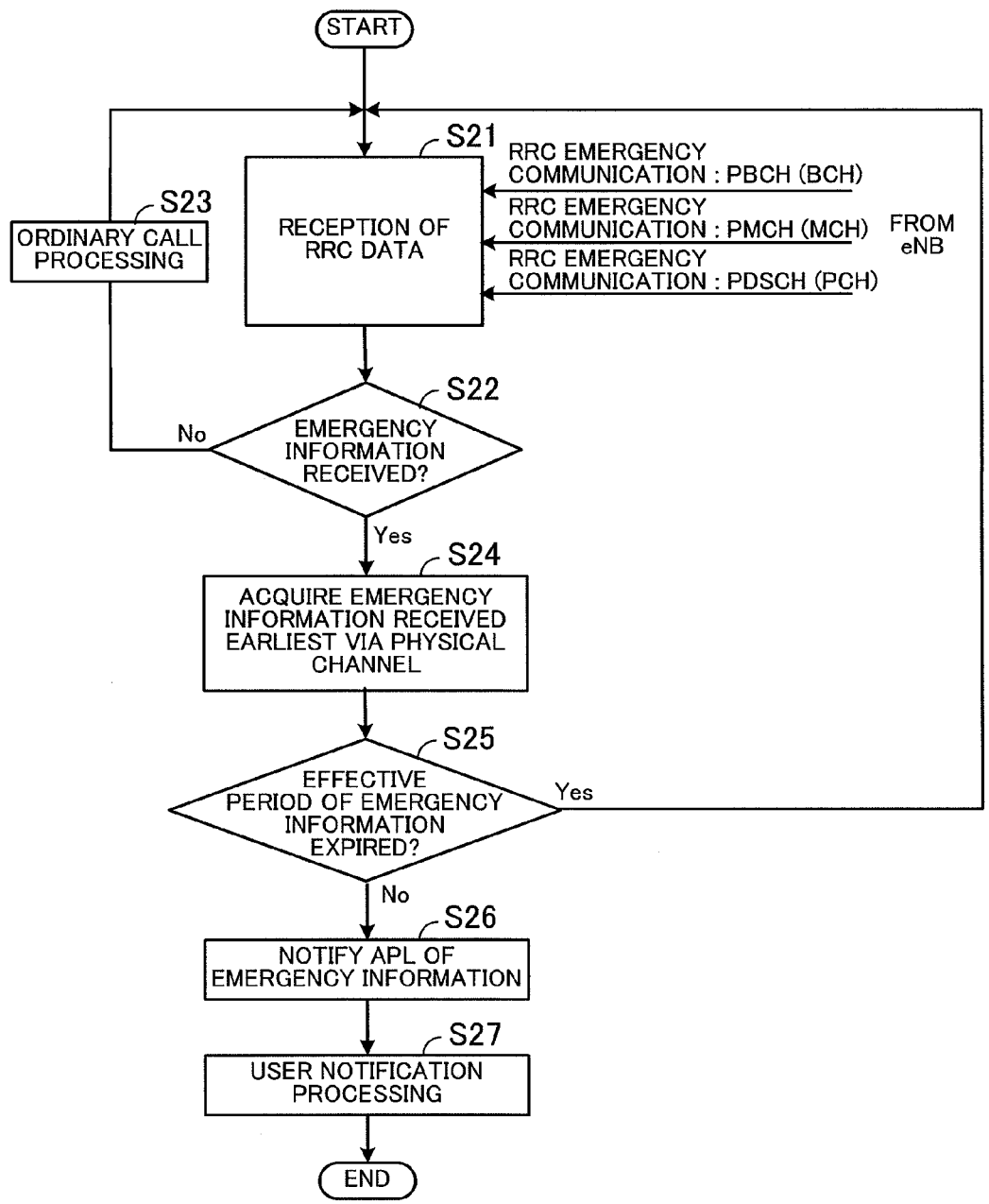
FIG. 12 is a flowchart illustrating operation of the UE.

FIG. 12 is a flowchart illustrating the operation of the UE. The UE 14 recognizes its own state. For example, the UE 14 recognizes that it is currently in the Idle state, the connected state, or the MBMS active state.

In Step S21, the UE 14 receives RRC data from the eNB 11 via physical channels such as the PBCH, the PMCH and the PDSCH. In FIG. 12, the letters in parentheses represent the transport channels from which the RRC data has been mapped to the respective physical channels.

In Step S22, the UE 14 determines whether emergency information has been received or not. If emergency information has been received, the UE 14 proceeds to Step S24; if no emergency information has been received, the UE 14 proceeds to Step S23.

In Step S23, the UE 14 performs ordinary call processing.

In Step S24, the UE 14 acquires the emergency information received earliest via a certain physical channel. That is, since it is desirable that the user be given a warning or the like based on the emergency information received earliest, the UE 14 discards the emergency information received subsequently via the other physical channels.

In Step S25, the UE 14 determines whether the effective period of the acquired emergency information has expired or not. If the effective period of the acquired emergency information has already expired, the UE 14 proceeds to Step S21; if the effective period of the acquired emergency information has not expired yet, the UE 14 proceeds to Step S26.

Whether the effective period of the emergency information has expired or not is determined by the UE 14 because it is desirable that the emergency information be communicated to the user within the predetermined time, as explained above with reference to Step S5 in FIG. 10. The determination as to the effective period is made by the UE 14 in the same manner as explained above with reference to Step S5 in FIG. 10.

In Step S26, the UE 14 transfers the received emergency information to an application (APL) that presents a warning or the like to the user.

In Step S27, the UE 14 (the APL of the UE 14) notifies the user that the emergency information has been received, by blinking an LED (Light Emitting Diode) or sounding a warning tone, for example. Then, the UE 14 displays the contents of the emergency information on the display screen.

In this manner, the eNBs 11 to 13 each map the emergency information to a plurality of physical channels activated therein, to deliver the emergency information to the UEs 14. Consequently, each UE 14 can receive the emergency information immediately regardless of its state, that is, regardless of whether the UE 14 is in the standby state or in the communicating state.

Where the delivery time within which the emergency information is to be delivered to the UEs 14 has expired, the eNBs 11 to 13 stop delivering the emergency information. Thus, the eNBs 11 to 13 can deliver to the users only useful emergency information that permits the users to take appropriate measures against a disaster such as an earthquake or tsunami.

Also, the eNBs 11 to 13 deliver the emergency information by using the existing physical channels. The emergency information can therefore be communicated in a moment without the need to additionally provide a physical channel exclusively for the delivery of emergency information to the UEs 14. The cost of development can also be lowered.

Where the emergency information is delivered via only one of the PBCH and the PMCH, the emergency information can only be communicated to the UE 14 at the delivery intervals of either one of the PBCH and the PMCH. By delivering the emergency information by using the multiple channels PBCH and PMCH, however, it is possible to notify the UE 14 of the emergency information at the earlier one of the delivery intervals of the PBCH and the PMCH.

Also, on the basis of the emergency information received earliest, the UE 14 notifies the user of the emergency information, thus making it possible to allow the user more time to prepare for a disaster such as an earthquake or tsunami.

Further, where the time within which the emergency information is to be received has expired, the UE 14 discards the emergency information. Thus, the UE 14 can present to the user only useful emergency information that permits the user to take appropriate measures against a disaster such as an earthquake or tsunami.

In the foregoing description, when the emergency information illustrated in FIG. 4 is received, the eNBs 11 to 13 each assign the received emergency information to a plurality of activated transport channels, to thereby map the emergency information to a plurality of physical channels. Also, where the EmCH is provided as a transport channel, the eNBs 11 to 13 assign the received emergency information to the EmCH so that the emergency information may be multicast to a plurality of activated physical channels by means of the EmCH. Alternatively, each of the eNBs 11 to 13 may assign the received emergency information to a plurality of activated logical channels so that the emergency information may be mapped to a plurality of physical channels.

Let it be assumed, for example, that logical channels PCCH (Paging Control CHannel), BCCH, DTCH (Dedicated Traffic CHannel) and MTCH (Multicast Traffic CHannel) are activated in the eNBs 11 to 13. In this case, the eNBs 11 to 13 each assign the received emergency information to the PCCH, the BCCH, the DTCH and the MTCH. The emergency information assigned to the PCCH is mapped to the transport channel PCH, and the emergency information assigned to the BCCH is mapped to the transport channel BCH. The emergency information assigned to the DTCH is mapped to the transport channel DL-SCH, and the emergency information assigned to the MTCH is mapped to the transport channel MCH.

Consequently, the emergency information is delivered to the UE 14 via the physical channels PBCH, PMCH and PDSCH, so that the UE 14 is able to receive the emergency information without delay regardless of its state, namely, regardless of whether the UE 14 is in the standby state or the communicating state.

With the devices and methods disclosed herein, the specific information can be notified immediately regardless of the state of the wireless terminal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that various changes, substitutions, and alterations could be made hereto without departing from the spirit and scope of the invention.

What is claimed is:

1. A wireless base station which communicates wirelessly with a wireless terminal, the wireless base station comprising:
   an emergency information receiver configured to receive emergency information to be delivered to the wireless terminal;
   an emergency information deliverer configured to deliver the received emergency information to the wireless terminal via a plurality of physical channels in parallel by mapping the received emergency information to two or more kinds of transport channels activated in the wireless base station; and
   an emergency information delivery channel, as still another kind of transport channel, via which the emergency information received by the emergency information receiver is mapped to the plurality of physical channels.

2. The wireless base station according to claim 1, wherein the emergency information deliverer maps the emergency information received by the emergency information receiver, to a plurality of logical channels activated in the wireless base station, in order to deliver the emergency information via the plurality of physical channels.

3. The wireless base station according to claim 1, wherein the plurality of physical channels include a common channel via which information is broadcast to a plurality of wireless terminals including the wireless terminal, and a shared channel of which available radio resources are allocated to the wireless terminal to transmit information to the wireless terminal.

4. The wireless base station according to claim 3, wherein the common channel is provided in plurality.

5. The wireless base station according to claim 3, wherein, if the shared channel has no available radio resources allocable to the wireless terminal, the emergency information deliverer delivers the emergency information by using a control channel.

6. The wireless base station according to claim 1, further comprising a delivery stopper configured to stop delivery of the emergency information if a time within which the emergency information is to be delivered to the wireless terminal expires.

7. An emergency information delivery method for a wireless base station which communicates wirelessly with a wireless terminal, the emergency information delivery method comprising:
   receiving emergency information to be delivered to the wireless terminal;
   delivering the emergency information to the wireless terminal via a plurality of physical channels in parallel by mapping the received emergency information to two or more kinds of transport channels activated in the wireless base station; and
   mapping, via an emergency information delivery channel provided as still another kind of transport channel, the received emergency information to the the plurality of physical channels.

8. The wireless base station according to claim 1, wherein the emergency information deliverer maps the emergency information to two or more of Paging Channel (PCH), Broadcast Channel (BCH), Downlink Shared Channel (DL-SCH), and Multicast Channel (MCH) as the two or more kinds of transport channels.

* * * * *